(12) United States Patent
Gratacos

(10) Patent No.: US 7,889,597 B2
(45) Date of Patent: Feb. 15, 2011

(54) METHOD OF PROCESSING SEISMIC DATA ACQUIRED BY MEANS OF MULTI-COMPONENT SENSORS

(75) Inventor: Bruno Gratacos, Saint-Remy-les-Chevreuse (FR)

(73) Assignee: CGGVeritas Services SA, Massy (FR)

( * ) Notice: Subject to any disclaimer, the term of this patent is extended or adjusted under 35 U.S.C. 154(b) by 0 days.

(21) Appl. No.: 10/576,827

(22) PCT Filed: Oct. 22, 2004

(86) PCT No.: PCT/IB2004/003703

§ 371 (c)(1), (2), (4) Date: Apr. 24, 2006

(87) PCT Pub. No.: WO2005/040857

PCT Pub. Date: May 6, 2005

(65) Prior Publication Data

US 2007/0140056 A1 Jun. 21, 2007

(30) Foreign Application Priority Data

Oct. 23, 2003 (FR) .................................. 03 12432

(51) Int. Cl.
*G01V 1/00* (2006.01)
(52) U.S. Cl. .......................................... 367/38; 702/14
(58) Field of Classification Search ............... 367/15, 367/21, 37, 38, 40, 18; 702/14
See application file for complete search history.

(56) References Cited

U.S. PATENT DOCUMENTS

| 5,724,306 | A | | 3/1998 | Barr | |
|---|---|---|---|---|---|
| 6,021,090 | A | * | 2/2000 | Gaiser et al. | ................... 367/15 |
| 6,026,057 | A | * | 2/2000 | Byun et al. | ................... 367/52 |
| 6,205,403 | B1 | * | 3/2001 | Gaiser et al. | ................... 702/14 |
| 6,292,754 | B1 | * | 9/2001 | Thomsen | ..................... 702/14 |
| 6,430,105 | B1 | * | 8/2002 | Stephen | ....................... 367/15 |
| 2003/0109989 | A1 | | 6/2003 | Bagaini et al. | |

FOREIGN PATENT DOCUMENTS

GB           2 379 505 A    3/2003
WO          WO0151955    *   7/2001

* cited by examiner

*Primary Examiner*—Jack Keith
*Assistant Examiner*—Krystine Breier
(74) *Attorney, Agent, or Firm*—Fulbright & Jaworski, L.L.P.

(57) ABSTRACT

The invention relates to a method of processing seismic data acquired by means of a sensor having at least three geophone components, characterized in that estimators are determined which are combinations of these components making it possible to isolate the various data depending on whether they correspond to propagation with reflection or with conversion. The estimators find application in particular for determining a sensor reconstruction according to which the operators to be applied to the various components of the sensor are determined in such a way as to minimize the deviation between reference data and data obtained by applying the estimators to the sensor reconstruction, the operators thus determined being applied to the data acquired.

11 Claims, 2 Drawing Sheets

METHOD OF PROCESSING SEISMIC DATA ACQUIRED BY MEANS OF MULTI-COMPONENT SENSORS

CROSS-REFERENCE TO RELATED APPLICATION

This national phase application is based on PCT/IB2004/003703 filed on Oct. 22, 2004 which claims priority to French Application No. 0312432 filed Oct. 23, 2003 entitled "Method of Processing Seismic Data Acquired by Means of Multicomponent Sensors".

GENERAL FIELD

The invention relates to techniques for processing seismic data acquired by means of multicomponent sensors.

This invention is in particular applicable to acquisition by means of cables disposed on the bottom of the sea (so-called "OBC" or "Ocean Bottom Cable" techniques).

Multicomponent geophones capable of working in any position whatsoever, in particular at the bottom of the sea, have recently been proposed. This "omnitilt" probe technology has allowed new simplified cables (mechanical joints are no longer necessary) and allows acquisitions with a better seismic bandwidth.

However, the acquisition step does not make it possible to provide the true orientation of the geophones of the cable, although this information is indispensable for making it possible to process the data.

The invention proposes a processing which is intended to be implemented on raw data and which allows reorientation and calibration (intended to convert the measurements of various geophones into a common phase and amplitude response).

STATE OF THE ART

Techniques consisting in isolating from the signal the data which correspond to the first arrival at the sensor and in determining on the basis of these data a filter intended to be applied to the raw data so as to correct them and to thus obtain the components of the signal on the expected axes have already been proposed.

A proposal to this effect has been described in the article:
"Horizontal vector infidelity correction by general linear transformation"—Joe Dellinger et al.—SEG—9-14, September, 2001.

However, this technique is not necessarily optimal since the coupling mechanism which intervenes at the geophone level is not the same for the waves which correspond to a first arrival at the sensor and for the waves reflected or converted by the seismic horizons.

PRESENTATION OF THE INVENTION

The invention proposes another approach which employs the true data window for numerically reconstructing geophones oriented along the desired axes.

Implicitly, this approach compensates for the errors which are not related to the geophones themselves, but which are due to the fact that the coupling between the geophone and the waves to be recorded is different depending on whether it is necessary to make a vertical vibration movement rather than a horizontal movement (on account of gravity).

In the case of a cable, the coupling is furthermore different depending on whether the vibration movement is in the direction of the cable or transverse.

Moreover, since deeper windows are subject to a lower S/N (signal-to-noise) ratio, processing which implements trace stacks is moreover used.

The invention thus proposes, according to a first aspect, a method of processing seismic data acquired by means of a sensor having at least three geophone components, characterized in that estimators are determined which are combinations of these components making it possible to isolate the various data depending on whether they correspond to propagation with reflection or with conversion and in that, to determine a sensor reconstruction, the operators to be applied to the various components of the sensor are determined in such a way as to minimize the deviation between reference data and data obtained by applying the estimators to the sensor reconstruction, the operators thus determined being applied to the data acquired.

It is specified here that, in the remainder of the present text, the term geophone is understood to mean any velocity sensor and the term hydrophone any pressure sensor.

Preferred, but non limiting aspects of the method according to the first aspect of the invention are the following:
- the sensor furthermore including a hydrophone, the reference data for reconstructing a vertical geophone are derived from the data acquired by the hydrophone;
- the reference data for reconstructing a vertical geophone without hydrophone or for reconstructing horizontal geophones are derived from the application of the estimators to one of the geophones of the sensor;
- the orientation in the horizontal plane of a geophone component is obtained by minimizing the estimator of the transverse reflection;
- the estimators are determined as a function of a model of isotropic propagation or including the azimuthal anisotropy.

According to another more general aspect, the invention proposes a method of processing seismic data acquired by means of a sensor having at least three geophone components, characterized in that estimators are determined which are combinations of these components making it possible to isolate the various data depending on whether they correspond to propagation with reflection or with conversion. The estimators thus determined may find applications other than that forming the subject of the method according to the first aspect of the invention.

DESCRIPTION OF ONE OR MORE MODES OF IMPLEMENTATION OF THE INVENTION

Figure 1:
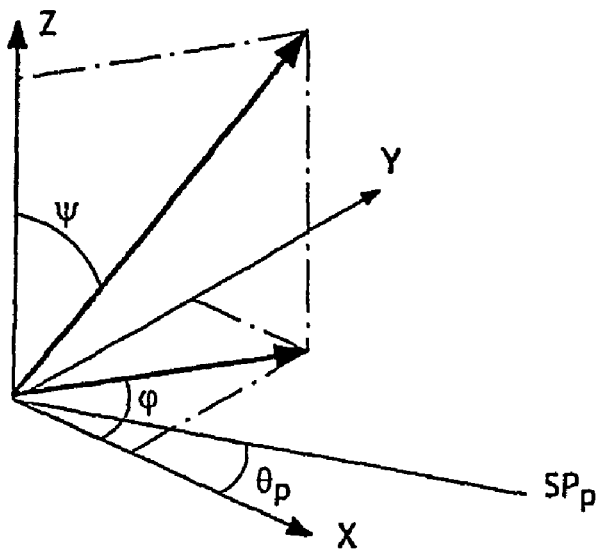
FIG. 1 is a diagrammatic representation giving the angular conventions used.

First Exemplary Implementation: Case of an Isotropic Propagation Model

Under the assumption of a locally 1 D (one dimensional) geology in proximity to the receivers, and assuming isotropic propagation of the earth, a given geophone, with an orientation $\phi\psi$, measures:

$$m_k = Rpp \cos(\psi)\delta pp_k + (Rps \cos(\theta_k-\phi) + Rtrsv \sin(\theta_k-\phi)) \sin(\psi)\delta ps_k$$

With:

k: index for the shotpoint (from 1 to N)

$\theta_k$: azimuth of the shotpoint with respect to the abscissa axis

—$R_{pp}$: reflectivity PP
$\delta_{pp}$: dynamic correction PP ("normal moveout" or NMO)
Rps: isotropic radial reflectivity PS
Rtrsv: isotropic transverse reflectivity PS
$\delta_{Ps}$: dynamic correction PS ("normal moveout" or NMO)

This model allows the evaluation of the reflectivity parameters from the set of traces $tr_k$ through simple processing of least squares comparison (ignoring ψ to begin with) in the Fourier domain, leading to the following equations:

$$\begin{pmatrix} N & wc(\varphi) & ws(\varphi) \\ wc(\varphi) & Sc2(\varphi) & Scs(\varphi) \\ ws(\varphi) & Scs(\varphi) & Ss2(\varphi) \end{pmatrix} \cdot \begin{pmatrix} Rpp \\ Rps \\ Rtrsv \end{pmatrix} = \begin{pmatrix} Svx \\ Shcx(\varphi) \\ Shsx(\varphi) \end{pmatrix}$$

Scalar Quantities:

$Sc(\phi)=\Sigma_k \cos(\theta_k-\phi)$   $Ss(\phi)=\Sigma_k \sin(\theta_k-\phi)$ $Sc2(\phi)=\Sigma_k \cos^2(\theta_k-\phi)$   $Ss2(\phi)=\Sigma_k \sin^2(\theta_k-\phi)$ $Scs(\phi)=\Sigma_k \cos(\theta_k-\phi)\sin(\theta_k-\phi)$ $N=Sc2+Ss2$ Wavelet Quantities:

$wc(\phi)=\Sigma_k \cos(\theta_k-\phi)\delta ps_k \delta pp_k^{-1}$ $ws(\phi)=\Sigma_k \sin(\theta_k-\phi)\delta ps_k \delta pp_k^{-1}$ Trace Stack Quantities for Geophone x:

$Svx=\Sigma_k x_k \delta pp_k^{-1}$ $Shcx(\phi)=\Sigma_k \cos(\theta_k-\phi) x_k \delta ps_k^{-1}$ $Shsx(\phi)=\Sigma_k \sin(\theta_k-\phi) x_k \delta ps_k^{-1}$ The solution of this linear system gives:

$\Delta iso\, Rpp \cos(\psi) = W\, Svx + (Scs\, ws - Ss2\, wc)Shcx + (Scs\, wc - Sc2\, ws)Shsx$ $\Delta iso\, Rps \sin(\psi) = Kis \cos(\phi) - Kic \sin(\phi)$ $\Delta iso\, Rtrsv \sin(\psi) = Kis \cos(\phi) - Kic \sin(\phi)$ With:

$W = Sc2\, Ss2 - Scs^2$ $\Delta iso = WN + wc(Scs\overline{ws} - Ss2\overline{wc}) + ws(Scs\overline{wc} - Sc2\overline{ws})$ $Kic = (Scs\overline{ws} - Ss2\overline{wc})Svx + (NSs2 - ws\,\overline{ws})Shcx + (-NScs + ws\,\overline{wc})Shsx$ $Kis = (Scs\overline{wc} - Sc2\overline{ws})Svx + (-NScs + wc\,\overline{ws})Shcx + (NSc2 - wc\,\overline{wc})Shsx$ This modelling allows evaluations taking account of the following properties:
a. Rpp does not depend on φ,
b. $|Rps|^2 + |Rtrsv|^2$ does not of course depend on φ either,
c. Δiso is in practice rapidly steady over time and can be ignored for the calibration/orientation procedure, since it is common to all the geophones of one and the same receiver.

Evaluations of Dense Shots

Most of the OBC acquisitions are gleaned using a dense and regular grid of sources, which allows considerable simplification:

$Sc=Ss=0$, $wc=ws=0$ (symmetry of the sources with respect to the receivers)

$Scs=0$ $Sc2=Ss2=N/2$ (isotropic source distribution)

Next, the exact solution can be obtained through the approximation:

$N\, Rpp \cos(\psi) = Svx$ $N\, Rps \sin(\psi) = 2\, Shcx(\phi)$ $Rtrsv \sin(\psi) = 2\, Shsx(\phi)$ This approximation leads to very simple calculations, not involving any wavelets, and can be applied immediately.

Orientation of the Geophones

Since Rtrsv does not exist physically, the minimization of the energy of Rtrsv leads to a trigonometric equation which gives the true orientation $\phi_{geo}$ (+k π):

$$\tan(2\phi_{geo}) = 2\left(\sum_t Kic_t\, Kis_t\right) / \left(\sum_t Kic_t^2 - \sum_t Kis_t^2\right)$$

$((E\text{max} - E\text{min})/(E\text{max} + E\text{min}))^{1/2}$ gives a check on the quality of the reorientation.

Moreover, if one wishes to find the orientation according to the first arrivals, it is possible to correct the said first arrivals so as to set them to one and the same arrival time, then to simplify kic and kis by replacing the wavelets wc and ws by the scalars sc and ss, by considering that the waves recorded horizontally are in fact the projection of the radial wave P, present on all the geophones since it is oblique.

Geophone Vertical Composite Calibration:

With the geophones $g_1$, $g_2$, $g_3$, we construct a vertical composite geophone v, $v = op_1 * g_1 + op_2 * g_2 + op_3 * g_3$ (or comprising additional similar terms in the case where extra geophones are present in the receiver) where $op_1$, $op_2$, $op_3$ are the filters of finite length and $op_u * g_u$ represents the convolution of geophone $g_u$ with filter $op_u$.

such that:

$E1 = |XH - XV|^2 = |Kic(v)|^2 + |Kis(v)|^2$

The energy of the difference between XH (hydrophone after application of the geophone phantom, or cross-ghost hydrophone) and XV (the vertical composite geophone after application of the hydrophone phantom or cross-ghost geophone), (see for example in this regard the Applicant's Patent Application FR 2 743 896).

$E2 = |Rps(v)|^2 + |Rtrsv(v)|^2$ horizontal energy of the vertical composite, $E = \lambda E1 + (1-\lambda)E2$ is a quadratic form in the coefficients of the filters and can be reduced to the minimum, thus giving a linear system to be solved. (λ is a matching parameter, $0 <= \lambda <= 1$, which favours either a greater adjustment to the reference hydrophone or a greater minimization of the shear energy).

In the case of terrestrial data, that is to say if there is no hydrophone available, it is possible to choose one of the geophones as reference and to replace the hydrophone by $Rpp(g_{ref})$.

Calibration in a Horizontal Arbitrary Direction

With $g = op_1 * g_1 + op_2 * g_2 + op_3 * g_3$ and $\phi_g$ an arbitrary direction, We define:

$E1 = |Rps(g, \phi_g) - Rps(ref, \phi_{ref})|^2$, as being the energy of the difference between the evaluation of Rps of the arbitrary composite geophone and the evaluation of Rps of a reference geophone (in general the geophone oriented in the direction of the cable).

$$E2=|Rpp(g)|^2+|Rtrsv(g,\phi_g)|^2 \text{ (the nonradial energy)}$$

$E=\lambda E1+(1-\lambda)E2$ allows the derivation of a composite horizontal geophone in the desired direction, having the same frequency response as the reference geophone, and with a minimum PP contamination.

Considering the cases $\phi_{ref}=0$ and $\phi_{ref}=\pi/2$, it is possible by simple trigonometric combination to generate the radial and transverse projections.

Second Exemplary Implementation: Case of Anisotropic Azimuthal Propagation Modelling Let $\alpha$ be the direction of the natural fast propagation axis. The modelling of the measurement of the geophone becomes (using one or other of Rps1 and Rps2 the two images along the natural directions, or Rps and $\delta$Rps defined by Rps1=Rps+$\delta$Rps, Rps2=Rps-$\delta$Rps):

$$m_k=Rpp\cos(\psi)\delta pp_k+(Rps1\cos(\phi-\alpha)\cos(\theta_k-\alpha)+Rps2\sin(\phi-\alpha)\sin(\theta_k-\alpha))\sin(\psi)\delta ps_k$$

$$m_k=Rpp\cos(\psi)\delta pp_k+(Rps\cos(\theta_k-\phi)+\delta Rps\cos(\theta_k+\phi-2\alpha))\sin(\psi)\delta ps_k$$

giving the normal equations $$M = \begin{pmatrix} N & wc(\varphi) & wc(2\alpha-\varphi) \\ \overline{wc(\varphi)} & Sc2(\varphi) & Sc2(\alpha)-N\sin^2(\alpha-\varphi) \\ \overline{ws(2\alpha-\varphi)} & Sc2(\alpha)-N\sin^2(\alpha-\varphi) & Sc2(2\alpha-\varphi) \end{pmatrix}$$

$$M \cdot \begin{pmatrix} Rpp \\ Rps \\ \delta Rps \end{pmatrix} = \begin{pmatrix} Svx \\ Shcx(\varphi) \\ Shcx(2\alpha-\varphi) \end{pmatrix}$$

The solution of this linear system gives:

$$\Delta iso\, Rpp\cos(\psi)=\text{unchanged}$$

$$\Delta aniso\, Rps\sin(\psi)=(Kac\cos(2\alpha-\phi)+Kas\sin(2\alpha-\phi))\sin(2\alpha-\phi))$$

$$\Delta aniso\, Rtrsv\sin(\psi)=(-Kac\cos(\phi)-Kas\sin(\psi))\sin(2(\alpha-\phi))$$

With:

$$\Delta aniso=\sin^2(2(\alpha-\phi))\Delta iso$$

$$Kac=(Sc2\overline{ws}-Scs\overline{wc})Svx+(N\,Scs-wc\overline{ws})Shcx-(N\,Sc2-wc\overline{wc})Shsx$$

$$Kas=(-Ss2\overline{wc}+Scs\overline{ws})Svx+(N\,Ss2-ws\overline{ws})Shcx-(N\,Scs-ws\overline{wc})Shsx$$

Vertical Calibration of Composite Geophone:
The isotropic process remains applicable with the change $$E2=|Kac(g)|^2+|Kas(g)|^2$$

Horizontal Arbitrary Calibration or Rows/Columns of Composite Geophones

The observation of $\delta$Rps over the data field makes it possible to diagnose the presence (or otherwise) of significant azimuthal anisotropy. (the quantity $\sin^2(2(\alpha-\phi))$ $\delta$Rps does not require a knowledge of $\alpha$ for its calculation).

The isotropic process remains applicable with the changes $$E2=|\delta Rps(v)|^2 \text{ and } E=\lambda(E1+E2)+(1-\lambda)E3.$$

When $\alpha$ is not generally known, a scan over a range of $\pi/2$ is implemented, using the value of $\alpha$ which minimizes Emini/E0.

The invention claimed is:

1. A method of processing seismic data corresponding to first arrival waves and to waves reflected or converted by the seismic horizons, the seismic data being acquired by an omnitilt sensor having at least three geophone components with an angular orientation $\phi\psi$, wherein estimators are determined which are combinations of these components, wherein various data are isolated, through the estimators, depending on whether they correspond to propagation with reflection or with conversion by the seismic horizons, and wherein operators to be applied to the various components of the sensor are determined for determining a sensor reconstruction, the operators being those that minimize a deviation between reference data and data obtained by applying the estimators to the sensor reconstruction, the operators thus determined being applied to the data acquired, said operators used to reconstruct the orientation of at least one geophone of the omnitilt sensor along at least one desired axis.

2. A method according to claim 1, in which, the sensor furthermore including a hydrophone, the reference data for reconstructing a vertical geophone are derived from the data acquired by the hydrophone.

3. A method according to claim 1, in which the reference data for reconstructing a vertical geophone without hydrophone or for reconstructing horizontal geophones are derived from the application of the estimators to one of the geophones of the sensor.

4. A method according to claim 1, wherein the orientation in the horizontal plane of geophone component is obtained by minimizing the estimator of the transverse reflection.

5. A method according to claim 1, wherein the estimators are determined as a function of a model of isotropic propagation or including the azimuthal anisotropy.

6. A method of processing seismic data acquired by means of a sensor having at least three geophone components, determining estimators, wherein said estimators are determined which are combinations of these components, wherein various data are isolated, through the estimators, depending on whether they correspond to propagation with reflection or with conversion, said estimators used to reconstruct the orientation of at least one geophone along at least one desired axis.

7. A method of processing seismic data, at least a portion of said data comprises first arrival waves and waves reflected or converted by the seismic horizons, the seismic data acquired by an omnitilt sensor having at least three geophone components, each geophone component has an angular orientation $\phi\psi$, said method comprises the steps of:

determining estimators, wherein said estimators comprises combinations of said geophone components;

isolating at least a segment of said data using said estimators, said isolation depends on whether said portion of said segment corresponds to propagation with reflection or with conversion by the seismic horizons;

determining operators for obtaining a sensor reconstruction, wherein said operators are determined to minimize the deviation between reference data and data obtained by applying the estimators to the sensor reconstruction; and applying said determined operators to the acquired seismic data, said application used to reconstruct the orientation of at least one geophone along at least one desired axis.

8. A method according to claim 7, wherein the sensor further comprises a hydrophone, said method further comprises the step of:

deriving the reference data for sensor reconstruction of a vertical geophone from the data acquired by the hydrophone.

9. A method according to claim 7 further comprises the step of:

deriving the reference data for reconstructing a vertical geophone without a hydrophone or for reconstructing horizontal geophones by applying the estimators to one of the geophones of the sensor.

10. A method according to claim 7 further comprises the step of:

obtaining the orientation in the horizontal plane of geophone component by minimizing the estimator of the transverse reflection.

11. A method according to claim 7, wherein the estimators are determined as a function of a model of isotropic propagation or including the azimuthal anisotropy.

* * * * *

UNITED STATES PATENT AND TRADEMARK OFFICE
CERTIFICATE OF CORRECTION

PATENT NO. : 7,889,597 B2
APPLICATION NO. : 10/576827
DATED : February 15, 2011
INVENTOR(S) : Bruno Gratacos Page 1 of 1

Figure 2:
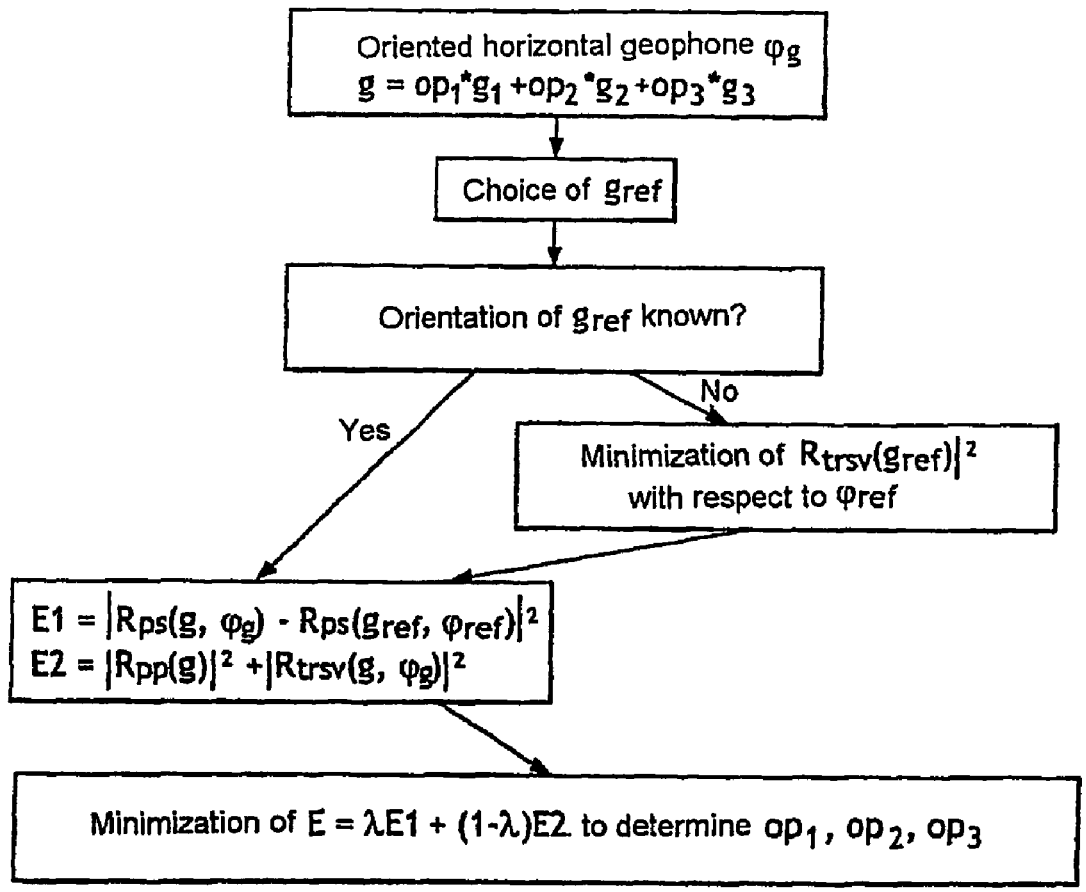
FIGS. 2 and 3 are flow charts giving the various steps of the processing respectively in one and the other of the two exemplary implementations described.
Figure 3:
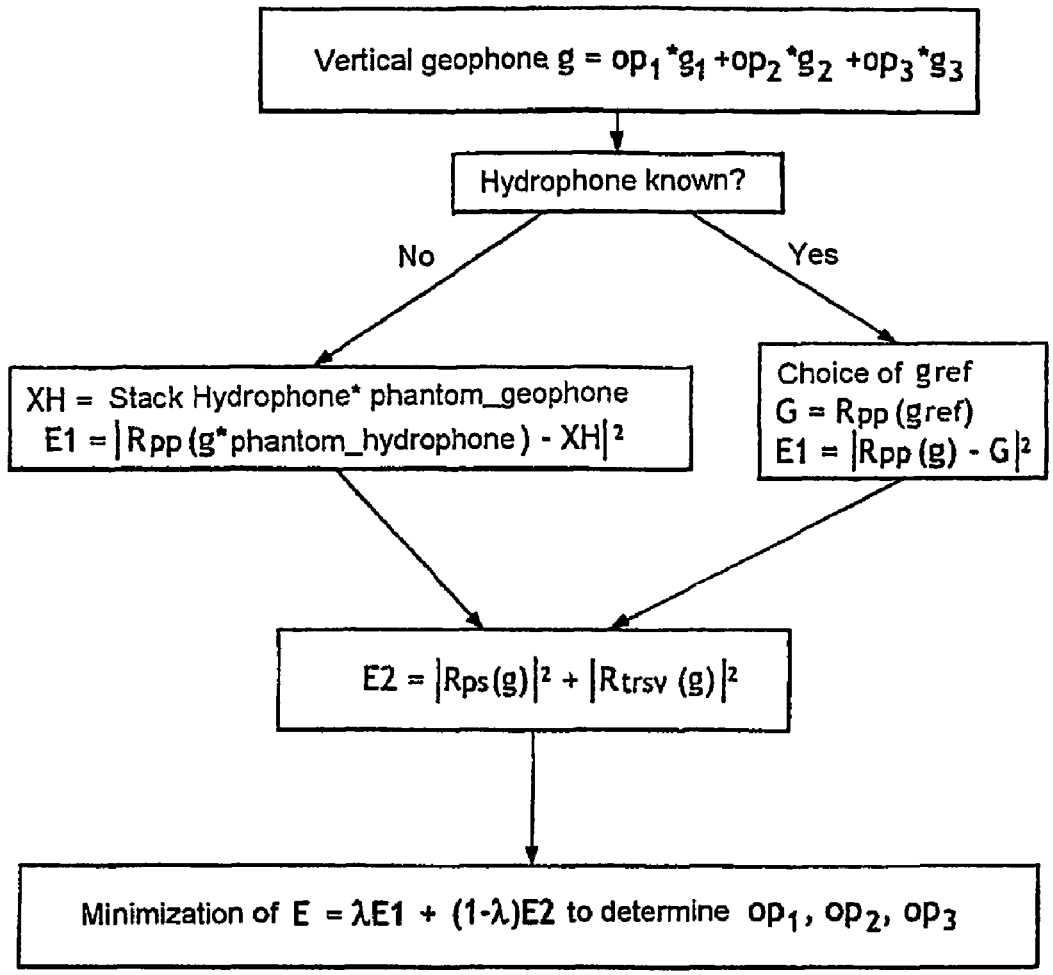

It is certified that error appears in the above-identified patent and that said Letters Patent is hereby corrected as shown below:

In Fig. 2, Sheet 1 of 2, delete " Minimization of $R_{trsv}(g_{ref})|^2$ " and insert -- Minimization of $|R_{trsv}(g_{ref})|^2$ --, therefor.

In Column 5, Lines 22-23, delete " $m_k = Rpp \cos(\psi)\delta pp_k + (Rps \cos(\theta_k - \phi) + \delta Rps \cos(\theta_k + \phi - 2\alpha))\sin(\psi)\delta ps^k$ "

and insert -- $m_k = Rpp \cos(\psi)\delta pp_k + (Rps \cos(\theta_k - \phi) + \delta Rps \cos(\theta_k + \phi - 2\alpha))\sin(\psi)\delta ps_k$ --, therefor.

In Column 5, Lines 42-43, delete " $\Delta aniso\ Rtrsv\ \sin(\psi) = (-Kac \cos(\phi) - Kas \sin(\psi))\sin(2(\alpha - \phi))$ "

and insert -- $\Delta aniso\ Rtrsv\ \sin(\psi) = (-Kac \cos(\phi) - Kas \sin(\phi))\sin(2(\alpha - \phi))$ --, therefor.

Signed and Sealed this
Fifteenth Day of May, 2012

David J. Kappos
*Director of the United States Patent and Trademark Office*